(12) United States Patent
Terai et al.

(10) Patent No.: US 11,707,783 B2
(45) Date of Patent: Jul. 25, 2023

(54) MANUFACTURING FACILITY AND MANUFACTURING METHOD OF SINTERED PRODUCT

(71) Applicant: SUMITOMO ELECTRIC SINTERED ALLOY, LTD., Takahashi (JP)

(72) Inventors: Hiroaki Terai, Takahashi (JP); Masayuki Tauchi, Takahashi (JP); Kenji Nawachi, Takahashi (JP); Naoto Igarashi, Takahashi (JP)

(73) Assignee: SUMITOMO ELECTRIC SINTERED ALLOY, LTD., Takahashi (JP)

( * ) Notice: Subject to any disclaimer, the term of this patent is extended or adjusted under 35 U.S.C. 154(b) by 611 days.

(21) Appl. No.: 16/636,052

(22) PCT Filed: Jul. 25, 2018

(86) PCT No.: PCT/JP2018/027913
§ 371 (c)(1),
(2) Date: Feb. 3, 2020

(87) PCT Pub. No.: WO2019/026726
PCT Pub. Date: Feb. 7, 2019

(65) Prior Publication Data
US 2021/0086262 A1 Mar. 25, 2021

(30) Foreign Application Priority Data
Aug. 4, 2017 (JP) .................................. 2017-151730

(51) Int. Cl.
*B22F 3/10* (2006.01)
*B22F 3/24* (2006.01)
(Continued)

(52) U.S. Cl.
CPC .................. *B22F 3/10* (2013.01); *B22F 3/03* (2013.01); *B22F 3/24* (2013.01); *G05B 19/182* (2013.01);
(Continued)

(58) Field of Classification Search
None
See application file for complete search history.

(56) References Cited

U.S. PATENT DOCUMENTS

2019/0217388 A1  7/2019  Take
2020/0147728 A1* 5/2020  Terai .......................... B22F 3/10

FOREIGN PATENT DOCUMENTS

JP   2002-362964 A   12/2002
JP   2007-304999 A   11/2007
(Continued)

*Primary Examiner* — Xiaobei Wang
(74) *Attorney, Agent, or Firm* — Faegre Drinker Biddle & Reath LLP

(57) ABSTRACT

A manufacturing facility of a sintered product according to one aspect of the present disclosure includes: a molding apparatus configured to press-mold raw material powder containing metal powder to fabricate powder compacts; a marking apparatus configured to mark a product ID including a serial number on each of the powder compacts; a batch processing apparatus configured to perform a predetermined batch process on intermediate materials which are the powder compacts or sintered articles of the powder compacts; a reader apparatus configured to read the product ID of each of the intermediate materials loaded in a batch case of the batch processing apparatus; and a server apparatus configured to communicate with the apparatuses. The server apparatus includes: a communication unit configured to receive a read value of the product ID from the reader apparatus; and a control unit configured to specify a load position of each of the intermediate materials in the batch case based on the received read value.

5 Claims, 6 Drawing Sheets

(51) Int. Cl.
    *G05B 19/18*     (2006.01)
    *B22F 3/03*     (2006.01)

(52) U.S. Cl.
    CPC ....... *B22F 2203/03* (2013.01); *B22F 2998/10* (2013.01); *G05B 2219/49018* (2013.01)

(56) References Cited

FOREIGN PATENT DOCUMENTS

| | | |
|---|---|---|
| JP | 2017-14552 A | 1/2017 |
| WO | WO-2004/091876 A1 | 10/2004 |
| WO | WO-2017/002404 A1 | 1/2017 |

\* cited by examiner

MANUFACTURING FACILITY AND MANUFACTURING METHOD OF SINTERED PRODUCT

TECHNICAL FIELD

The present invention relates to a manufacturing facility and a manufacturing method of a sintered product.

The present application claims priority to Japanese Patent Application No. 2017-151730 filed on Aug. 4, 2017, the entire contents of which are incorporated by reference herein.

BACKGROUND ART

A sintered article (sintered alloy) obtained by sintering a mold article of metal powder such as iron powder is used as an automotive component or a mechanical component. A product formed of such sintered alloy (hereinafter referred to as "the sintered product") includes, for example, a sprocket, a rotor, a gear, a ring, a flange, a pulley, a vane, a bearing and the like.

In general, a sintered product is manufactured by; subjecting raw material powder containing metal powder to press-molding to fabricate a powder compact; and sintering the powder compact. After the sintering, any finishing work is performed as necessary.

Patent Literature 1 discloses manufacturing a sintered article, in which a marking apparatus which provides a mark for identifying the processing history of a product is disposed between a powder compact processing machine (specifically, a boring process) and a sintering apparatus, so that the sintered article with the mark containing the information of the processing history is manufactured.

In this case, reading the mark specifies the processing history of a sintered article. Thus, advantageously, the processing history of the sintered article is easily specified.

CITATION LIST

Patent Literature

Patent Literature 1: Japanese Unexamined Patent Publication No. 2017-14552 (claim 7)

SUMMARY OF INVENTION (1) A manufacturing facility of a sintered product according to one aspect of the present invention includes: a molding apparatus configured to press-mold raw material powder containing metal powder to fabricate powder compacts; a marking apparatus configured to mark a product ID including a serial number on each of the powder compacts; a batch processing apparatus configured to perform a predetermined batch process on intermediate materials which are the powder compacts or sintered articles of the powder compacts; a reader apparatus configured to read the product ID of each of the intermediate materials loaded in a batch case of the batch processing apparatus; and a server apparatus configured to communicate with the apparatuses. The server apparatus includes: a communication unit configured to receive a read value of the product ID from the reader apparatus; and a control unit configured to specify a load position of each of the intermediate materials in the batch case based on the received read value.

(5) A manufacturing method according to one aspect of the present invention includes: a molding step of press-molding raw material powder containing metal powder to fabricate powder compacts; a marking step of marking a product ID including a serial number on each of the powder compacts; a batch processing process of performing a predetermined batch process on intermediate materials which are the powder compacts or sintered articles of the powder compacts; a reading step of reading the product ID of each of the intermediate materials loaded in a batch case used in the batch processing process; and a step of specifying a load position of each of the intermediate materials in the batch case based on the read value acquired in the reading step.

DESCRIPTION OF EMBODIMENTS

Technical Problem

Figure 1:
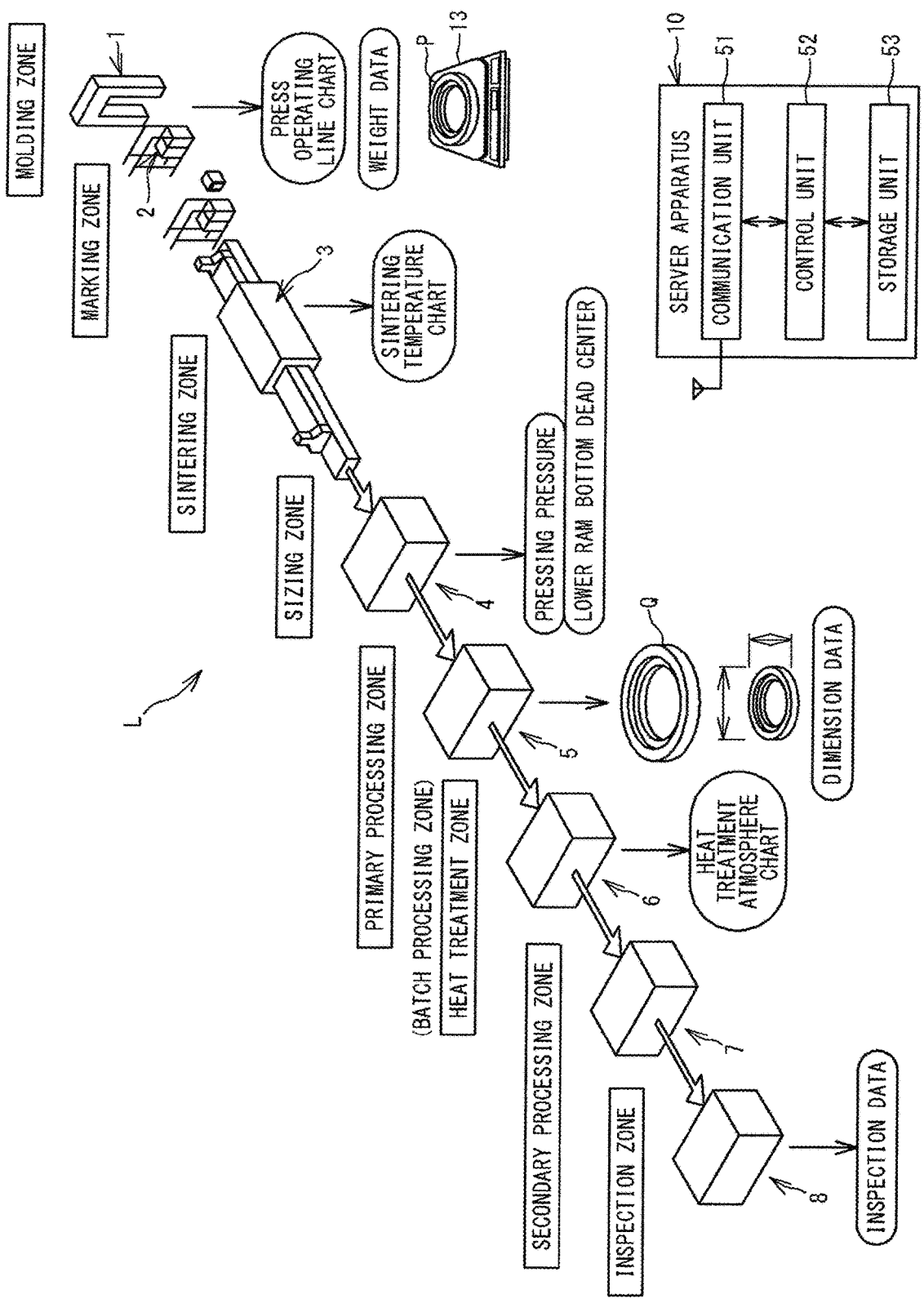
FIG. 1 is an overall configuration illustration of a manufacturing facility according to one embodiment of the present invention.

The processing history in Patent Literature 1 means, in the case where, for example, there exist a plurality of boring processing apparatuses, information indicative of by which processing apparatus and at what time point a sintered article was processed (paragraph 0077 in Patent Literature 1). That is, Patent Literature 1 does not take into consideration of the history of the manufacturing process other than the boring process.

Accordingly, the manufacturing facility disclosed in Patent Literature 1 cannot provide monitoring, in a production line including a batch-scheme heat treatment apparatus or the like for example, the history of the batch processing process such as the history of a heat treatment process for each sintered product.

In view of the above-described problem, an object of the present disclosure is to provide a manufacturing facility including both of a one-piece flow unit and a batch process in which the history of a batch processing process also can be monitored for each product.

Advantageous Effects of Invention

The present disclosure realizes monitoring the history of a batch processing process for each product in a manufacturing facility including a batch processing apparatus.

Solution to Problem

In the following, the overview of the embodiment of the present invention is summarized.

(1) A manufacturing facility according to the present embodiment includes: a molding apparatus configured to press-mold raw material powder containing metal powder to fabricate powder compacts; a marking apparatus configured to mark a product ID including a serial number on each of the powder compacts; a batch processing apparatus configured to perform a predetermined batch process on intermediate materials which are the powder compacts or sintered articles of the powder compacts; a reader apparatus configured to read the product ID of each of the intermediate materials loaded in a batch case of the batch processing apparatus; and a server apparatus configured to communicate with the apparatuses. The server apparatus includes: a communication unit configured to receive a read value of the product ID from the reader apparatus; and a control unit configured to specify a load position of each of the intermediate materials in the batch case based on the received read value.

In the manufacturing facility according to the present embodiment, the communication unit of the server apparatus receives the read value of the product ID from the reader apparatus, and the control unit of the server apparatus specifies the load position of each of the intermediate materials in the batch case based on the received read value. Thus, it becomes possible to monitor the location of the intermediate material of a predetermined product ID in the heat treatment apparatus in the heat treatment process. Thus, the history of the batch processing process can be monitored for each product.

(2) In the manufacturing facility according to the present embodiment, the server apparatus preferably further includes a storage unit configured to store correspondence between a loading order of the intermediate materials into the batch case and a load position of each of the intermediate materials in the batch case.

(3) In this case, the communication unit may receive, from the reader apparatus, the read value as to firstly and finally loaded ones of the intermediate materials loaded into the batch case. The storage unit may store the received read value. The control unit may specify the load position for every one of the intermediate materials in the batch case based on the stored read value and the correspondence.

In this manner, reading just the product IDs of the first and final sintered articles specifies the load position for every one of the intermediate materials loaded in the batch case.

This contributes to reducing the frequency of the reader apparatus reading the product IDs. In particular, in the case where the intermediate materials of 1000 pieces or more are loaded in a batch case, the frequency of the reader apparatus reading the product IDs is largely reduced. This reduces the time taken for the work of loading the intermediate materials in the batch case.

(4) When the manufacturing facility of the present embodiment further includes: a sintering apparatus configured to sinter the powder compacts to fabricate the sintered articles; and a stock adjusting apparatus configured to adjust a stock amount of the sintered articles carried out from the sintering apparatus, preferably, the stock adjusting apparatus is capable of increasing, upon occurrence of an error, a capacity of the stock amount for the sintered articles so that all the sintered articles in a sintering chamber of the sintering apparatus are stored.

In this case, the capacity of the stock amount of the sintered articles upon occurrence of an error is increased so that all the sintered articles in the sintering chamber of the sintering apparatus can be stored. Thus, when all the apparatuses in the production line are stopped due to occurrence of an error, the sintering apparatus can be normally stopped without leaving the sintered articles inside the sintering apparatus.

(5) A manufacturing method of the present embodiment relates to a method of manufacturing a sintered product executed in the manufacturing facility according to (1) to (4).

Accordingly, the manufacturing method of the present embodiment achieves the similar operation and effect to those of the manufacturing facility according to (1) to (4).

Details of Embodiment of the Present Invention

In the following, with reference to the drawings, a description will be given of a specific example of a manufacturing facility according to the present embodiment.

[Overall Configuration of Manufacturing Facility]

FIG. 1 is an overall configuration illustration of a manufacturing facility according to the embodiment of the present invention.

As shown in FIG. 1, the manufacturing facility according to the present embodiment includes a production line L of sintered products installed in a factory. The production line L includes a molding apparatus 1, a marking apparatus 2, a sintering apparatus 3, a sizing apparatus 4, a primary processing apparatus 5, a heat treatment apparatus 6 which is one type of a batch processing apparatus, a secondary processing apparatus 7, and an inspection apparatus 8. The production line L also includes a passing detecting apparatus 9 (see FIG. 2) and a server apparatus 10.

The molding apparatus 1 is an apparatus which fabricates a powder compact P from raw material powder, and includes at least one press-molding machine 12 (see FIG. 2) which press-molds raw material powder containing metal powder. The molding apparatus 1 also includes a weight measuring device 13 which measures the weight of the powder compact P immediately after the molding.

The powder compact P which is an intermediate material of a sintered product is molded by the press-molding machine 12 into a predetermined shape. The powder compact P has the surface portion wide enough to mark a predetermined identification display.

The marking apparatus 2 is an apparatus which marks an identification display on the powder compact P, and is, for example, a laser marker. The predetermined identification display may be, for example, a two-dimensional code (a data matrix) or a QR code ("QR code" is a registered trademark).

Figure 2:
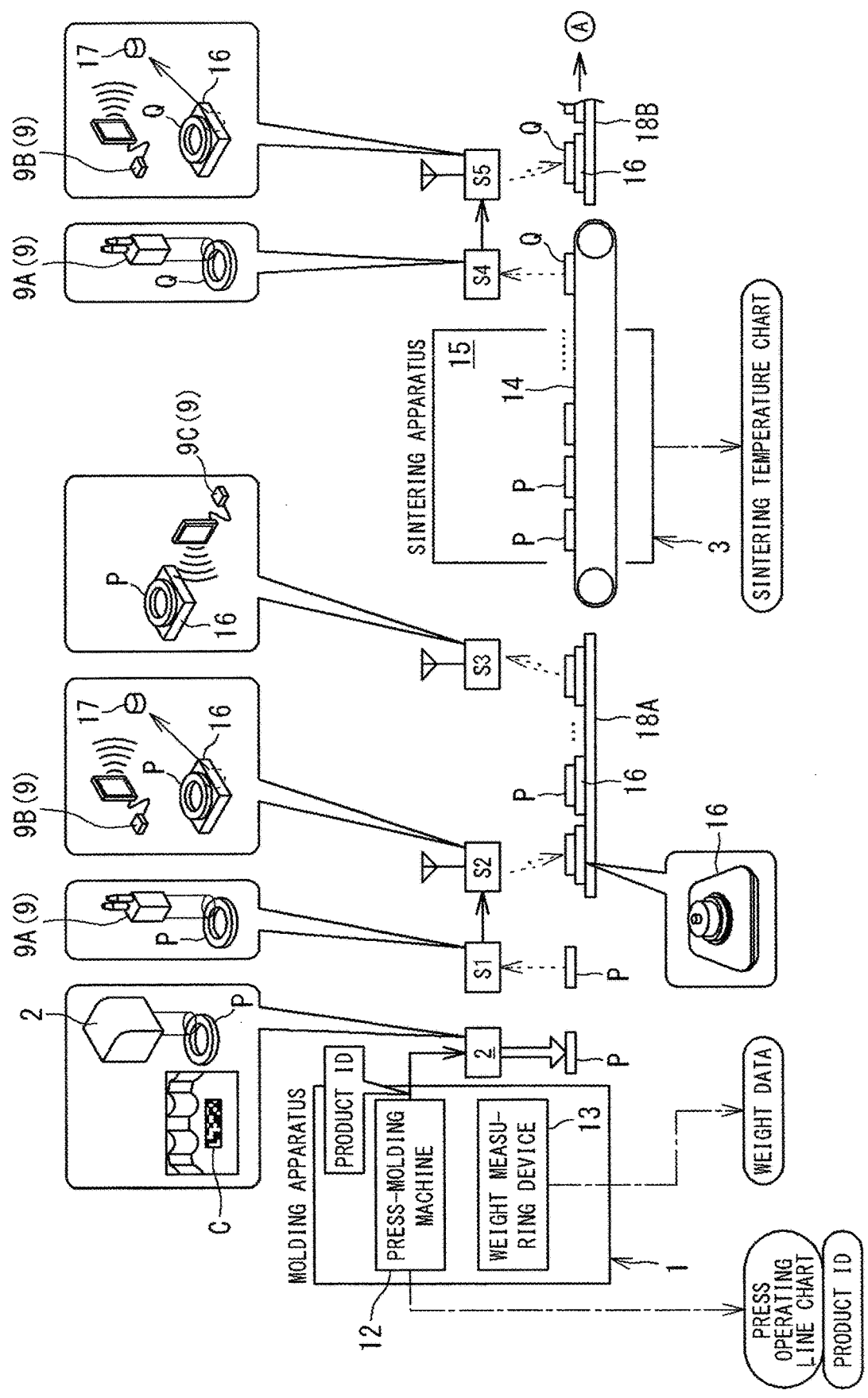
FIG. 2 is an explanatory illustration showing a data collection flow in a production line.

In the present embodiment, for the purpose of minimizing the area of the identification display on one product, the identification display is a two-dimensional code C (see FIG. 2).

The two-dimensional code C records predetermined identification information (hereinafter referred to as "the product ID") capable of uniquely identifying one sintered product and defining the sintered product immediately after the press-molding.

The product ID is information including, for example, the molding time and the molding time point (year, month, and day, and hour, minute, second in the day) with the molding apparatus 1, the code number of any drawings, the code number of the press-molding machine 12 included in the molding apparatus 1, and the code number of the factory. The powder compact P is press-molded one by one for each time point. Therefore, the molding time point of the product ID forms the serial number of the sintered product.

The sintering apparatus 3 is, for example, a mesh-belt continuous sintering furnace, and includes a mesh belt 14 conveying in a predetermined direction and a sintering chamber 15 covering the outside of the mesh belt 14 (see FIG. 2).

The marked powder compact P is supplied to the sintering chamber 15 conveyed on the mesh belt 14. The powder compact P is heated and sintered in the sintering chamber 15. The sintering temperature in the sintering chamber 15 is equal to or lower than the melting point of the main metal powder (for example, falling within a range of 1000° C. to 1400° C.), and the sintering time is set to fall within a range of, for example, 20 minutes to 60 minutes inclusive.

The sizing apparatus 4 is an apparatus which further compresses the intermediate material which is the sintered powder compact P (hereinafter referred to as "the sintered article Q"), to improve the dimension precision of the sintered article Q.

The sizing apparatus 4 is, for example, a turntable-scheme press-molding machine 21 (see FIG. 3) including a lower die on which the sintered article Q is set by a robot arm or the like, and an upper die pressing the set sintered article Q from above.

The primary processing apparatus 5 is an apparatus which performs a predetermined primary process on the sized sintered article Q. The primary processing apparatus 5 includes at least one processing machine corresponding to the type of the primary work performed on the sized sintered article Q.

Figure 3:
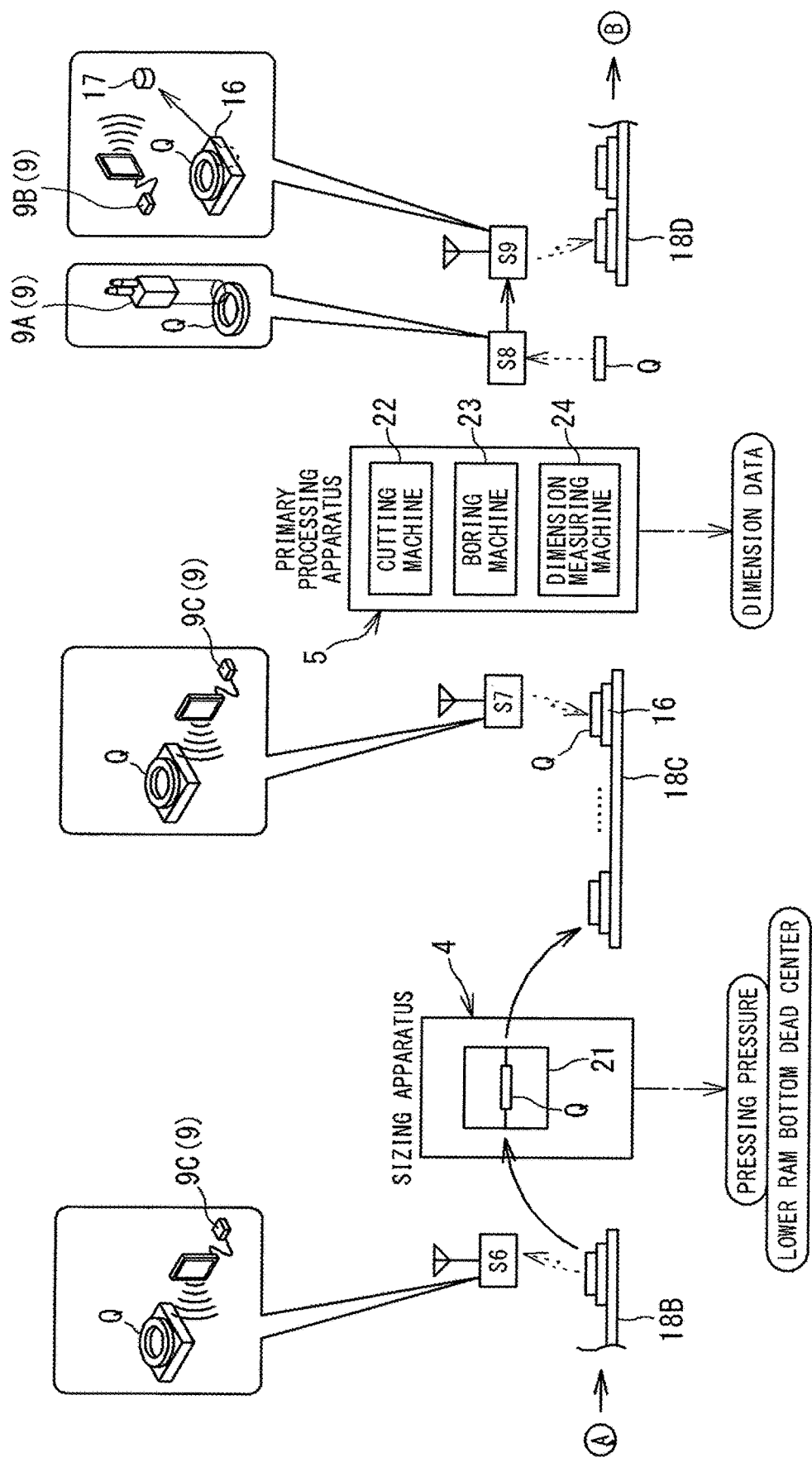
FIG. 3 is an explanatory illustration showing the data collection flow in the production line.

For example, the primary processing apparatus 5 includes at least one cutting machine 22 and at least one boring machine 23 (see FIG. 3). The primary processing apparatus 5 also includes a dimension measuring machine 24 for the sintered article Q having undergone the primary process (see FIG. 3).

The heat treatment apparatus 6 is an apparatus which performs heat treatment for curing the surface of the sintered article Q having undergone the primary process. The heat treatment apparatus 6 according to the present embodiment is a batch-scheme heat treatment apparatus (batch processing apparatus) which performs heat treatment for each group of sintered articles Q (for example, 1000 to 1500 pieces).

The heat treatment apparatus 6 at least includes a hardening furnace which performs carburizing and hardening on the sintered article Q having undergone the primary process, and a tempering furnace which tempers the sintered article Q having undergone hardening. The carburizing performed by the heat treatment apparatus 6 may be any of gas carburizing, vacuum carburizing, and ion carburizing.

The secondary processing apparatus 7 is an apparatus which performs a predetermined secondary process on the sintered article Q having undergone the heat treatment. The secondary processing apparatus 7 includes at least one processing machine corresponding to the type of the secondary process (finishing work) performed on the sintered article Q having undergone the heat treatment.

Figure 5:
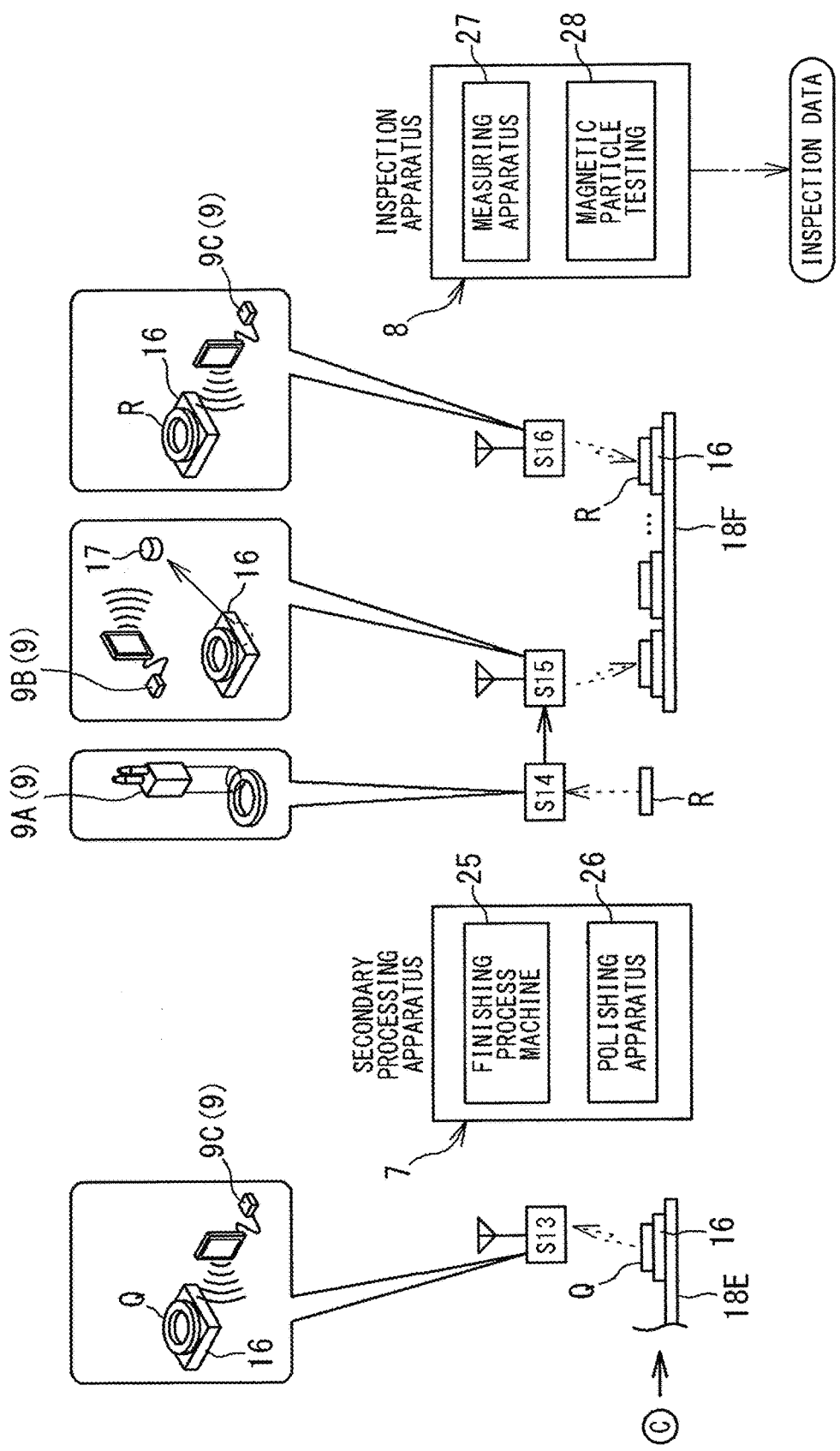
FIG. 5 is an explanatory illustration showing the data collection flow in the production line.

For example, the secondary processing apparatus 7 may include at least one finishing process machine 25 and at least one polishing apparatus 26 (see FIG. 5).

The inspection apparatus 8 is an apparatus which performs a predetermined inspection on the sintered article Q having undergone the secondary process (final product R).

The inspection apparatus 8 includes, for example, a roundness measuring apparatus 27 for the final product R and the magnetic particle testing apparatus 28 for nondestructively testing for any damage inside the final product R (see FIG. 5).

The server apparatus 10 includes at least one computer capable of establishing communication based on a predetermined communication standard such as wireless LAN (Local Area Network). The server apparatus 10 and the apparatuses 1 to 9 form a local communication network in the factory.

The transmission path of the communication network may be any of the wireless path and the wired path (a communication cable). The transmission path of the communication network may include both of the wireless communication path and the communication cable.

[Manufacture Data Compiled in Server Apparatus]

As shown in FIG. 1, the manufacture data compiled in the server apparatus 10 includes "a press operating line chart", "weight data", "a sintering temperature chart", "pressing pressure", "upper ram bottom dead center", "dimension data", "a heat treatment atmosphere chart", "inspection data" and the like.

The "press operating line chart" is data on the operation state of each pressing in the press-molding machine 12 of the molding apparatus 1. The "weight data" is a weight measurement value of the powder compact P measured by the weight measuring device 13.

The "sintering temperature chart" is temperature data on the temporal change in the internal temperature for each position in the belt convey direction of the sintering chamber 15.

The "pressing pressure" is the numerical value information of the pressing pressure for each press-molding performed by the press-molding machine 21 of the sizing apparatus 4. The "upper ram bottom dead center" is positional information on the upper ram generated for each press-molding performed by the press-molding machine 21 of the sizing apparatus 4.

The "dimension data" is the dimension data of the sintered article Q having undergone the primary process measured by the dimension measuring machine 24 included in the primary processing apparatus 5.

The "heat treatment atmosphere chart" is data on the temporal change in the in-furnace atmosphere of the heat treatment apparatus 6. The "inspection data" is data on the inspection result generated by the inspection apparatus 8 for each final product R.

[Passing Detecting Apparatus for Product]

As shown in FIGS. 2 to 5, the production line according to the present embodiment is provided with the passing detecting apparatus 9 for the product (the powder compact P, the sintered article Q or the final product R) at each of arbitrary locations.

The passing detecting apparatus 9 is an apparatus which detects as to what location in the production line and what time point the product with the two-dimensional code C passes. The passing detecting apparatus 9 according to the present embodiment includes a code reader 9A which reads the product ID from a picked up image of the two-dimensional code C.

The code reader 9A is an image pickup apparatus which reads the product ID displayed as the two-dimensional code C from the positions of black-color portions and white-color portions included in the image data of the two-dimensional code C.

When the code reader 9A reads the product ID from the image data of the two-dimensional code C, the code reader 9A transmits the communication frame containing the read value of the product ID and the read time point (the passing time point) to the server apparatus 10.

Meanwhile, as disclosed in paragraph 0031 of Patent Literature 1 (Japanese Unexamined Patent Publication No. 2017-14552), in employing a conveyor 18 for conveying the product one by one, preferably the product is disposed on a convey tray 16 and supplied to the conveyor 18 for the purpose of preventing any damage to the product.

As described in paragraph 0055 of Patent Literature 1, employing the convey tray 16 equipped with an IC tag 17, the wireless communication device communicating with the IC tag 17 makes it possible to monitor the passing time point and the positional information of the convey tray 16 conveyed by the conveyor 18 in the one-piece flow.

Accordingly, in the production line L of the present embodiment, in the section where the product is conveyed by the conveyor 18, a wireless writer 9B and a wireless reader 9C wirelessly communicating with the IC tag 17 of the convey tray 16 are provided on the feed side and the delivery side of the conveyor 18.

The wireless writer 9B is a wireless communication device which writes the product ID on the IC tag 17 of the convey tray 16. The wireless reader 9C is a wireless communication device which reads the product ID from the IC tag 17 of the convey tray 16.

The code reader 9A is connected to the wireless writer 9B so as to be capable of communicating, and transmits the read value of the product ID to the wireless writer 9B. The wireless writer 9B writes the received read value of the product ID on the IC tag 17 of the convey tray 16 on which the product bearing that product ID is disposed.

When the wireless reader 9C reads the product ID from the IC tag 17 of the convey tray 16, the wireless reader 9C transmits the communication frame containing the read value and the read time point to the server apparatus 10.

[Internal Configuration of Server Apparatus]

As shown in FIG. 1, the server apparatus 10 includes a communication unit 51, a control unit 52 including a CPU (Central Processing Unit) and the like, and a storage unit 53.

The communication unit 51 is a communication apparatus which exerts a communication process according to a predetermined communication standard. The communication unit 51 is capable of communicating with the apparatuses 1 to 9 in the factory via wired or wireless communication.

The control unit 52 reads and executes at least one computer program stored in the storage unit 53, to control the operation of the hardware and allows the computer to function as the server apparatus 10.

The control unit 52 includes a volatile memory element such as SRAM (Static RAM) or DRAM (Dynamic RAM). On the RAM of the control unit 52, the computer program executed by the CPU and any data necessary for the execution are temporarily stored.

The storage unit 53 is a non-volatile memory element such as flash memory or EEPROM (Electrically Erasable Programmable Read Only Memory), or a magnetic storage apparatus such as hard disk.

The communication unit 51 provides the control unit 52 with manufacture data such as the press operating line chart received from the apparatuses 1 to 9 in the factory. The control unit 52 accumulates the received manufacture data in the database of the storage unit 53.

The storage unit 53 stores the installation position of the code reader 9A and the wireless reader 9C and the identification information (for example, the MAC address) of them.

Accordingly, the control unit 52 of the server apparatus 10 extracts the read value of the product ID, the read time point, and the device information from the communication frame received from the code reader 9A and the wireless reader 9C, thereby monitoring at what location and what time point the product passes.

[Data Collection Flow]

FIGS. 2 to 5 are explanatory illustrations each showing a data collection flow in the production line L according to the present embodiment. In FIGS. 2 to 5, the code reader 9A, the wireless writer 9B and the wireless reader 9C are denoted by characters S1 to S16, and the numbers in the characters S1 to S16 represent the order from the upstream side.

In the following, with reference to FIGS. 2 to 5, a description will be given of the data collection flow performed in the production line L according to the present embodiment.

The handling of the powder compact P in the molding apparatus 1 and delivery of the powder compact P from the molding apparatus 1 to a conveyor 18A are performed in a one-piece flow with not-shown robot arms.

The press-molding machine 12 generates the product ID and the press operating line chart for each press-molding, and transmits the communication frame containing these pieces of information to the server apparatus 10. The weight measuring device 13 transmits the communication frame containing the weight data of the powder compact P immediately after molding to the server apparatus 10.

The press-molding machine 12 notifies the marking apparatus 2 of the generated product ID. Every time one powder compact P is supplied by the robot arm, the marking apparatus 2 marks the two-dimensional code C corresponding to the notified product ID on the powder compact P.

The powder compact P on which the two-dimensional code C is marked is disposed one by one on the convey tray 16 conveyed by the conveyor 18A by a not-shown robot arm.

Between the marking apparatus 2 and the upstream portion of the conveyor 18A (the left end of the conveyor 18A in FIG. 2), a code reader S1 and a wireless writer S2 are provided.

The code reader S1 transmits a communication frame containing the read value of the product ID and the read time point to the server apparatus 10, and notifies the wireless writer S2 of the read value of the product ID. The wireless writer S2 writes the notified read value of the product ID on the IC tag 17 of the convey tray 16 conveyed by the conveyor 18A.

The powder compact P conveyed by the conveyor 18A is separated from the convey tray 16 by a not-shown robot arm, and disposed on the mesh belt 14 of the sintering apparatus 3 so as to be aligned in a plurality of columns in the width direction.

Between the downstream portion of the conveyor 18A (the right end of the conveyor 18A in FIG. 2) and the sintering apparatus 3, a wireless reader S3 is provided.

The wireless reader S3 reads the product ID from the IC tag 17 of the convey tray 16, and transmits the communication frame containing the read value and the read time point to the server apparatus 10.

The wireless reader S3 is positioned at the feed portion of the sintering apparatus 3. Accordingly, the read time point of the wireless reader S3 substantially coincides with the supply time point of the powder compact P to the sintering apparatus 3.

The sintering apparatus 3 generates the sintering temperature chart inside the sintering chamber 15 every predetermined time (for example, one minute), and transmits the communication frame containing the generated sintering temperature chart to the server apparatus 10.

The sintered article Q delivered on the mesh belt 14 of the sintering apparatus 3 is picked up from the mesh belt 14 by a not-shown robot arm, and mounted one by one on the convey tray 16 conveyed by a conveyor 18B.

Between the sintering apparatus 3 and the upstream portion of the conveyor 18B (the left end of the conveyor 18B in FIG. 2), a code reader S4 and a wireless writer S5 are provided.

The code reader S4 transmits the communication frame containing the read value of the product ID and the read time point to the server apparatus 10, and notifies the wireless writer S5 of the read value of the product ID. The wireless writer S5 writes the notified read value of the product ID on the IC tag 17 of the convey tray 16 conveyed by the conveyor 18B.

The code reader S4 is positioned at the delivery portion of the sintering apparatus 3. Accordingly, the read time point of the code reader S4 substantially coincides with the sintering complete time point of the sintered article Q.

The sintered article Q conveyed by the conveyor 18B is separated from the convey tray 16 by a not-shown robot arm, and supplied one by one to the sizing apparatus 4.

Between the downstream portion of the conveyor 18B (the right end of the conveyor 18B in FIG. 3) and the sizing apparatus 4, a wireless reader S6 is provided.

The wireless reader S6 reads the product ID from the IC tag 17 of the convey tray 16, and transmits the communication frame containing the read value and the read time point to the server apparatus 10.

The wireless reader S6 is positioned at the feed portion of the sizing apparatus 4. Accordingly, the read time point of the wireless reader S6 substantially coincides with the press time point of the sizing apparatus 4 of the sintered article P.

The sizing apparatus 4 generates a pressing pressure and an upper ram bottom dead center for each press-molding, and transmits the communication frame containing the generated pressing pressure and upper ram bottom dead center to the server apparatus 10.

The handling of the sintered article Q in the sizing apparatus 4 and delivery of the sintered article Q from the sizing apparatus 4 to a conveyor 18C are performed in a one-piece flow with not-shown robot arms.

The production line L is provided with a robot arm which shifts the sintered article Q one by one from the conveyor 18B to the conveyor 18C, and other robot arm which shifts the convey tray 16 one by one from the conveyor 18B to the conveyor 18C. Accordingly, the sintered article Q is supplied to the conveyor 18C while the one-to-one relationship with the convey tray 16 is maintained.

The sintered article Q conveyed by the conveyor 18C is separated from the convey tray 16 by a not-shown robot arm, and supplied to the primary processing apparatus 5.

Between the downstream portion of the conveyor 18C (the right end of the conveyor 18C in FIG. 3) and the primary processing apparatus 5, a wireless reader S7 is provided.

The wireless reader S7 reads the product ID from the IC tag 17 of the convey tray 16, and transmits the communication frame containing the read value and the read time point to the server apparatus 10.

The wireless reader S7 is positioned at the feed portion of the primary processing apparatus 5. Accordingly, the read time point of the wireless reader S7 substantially coincides with the supply time point of the sintered article Q to the primary processing apparatus 5.

The dimension measuring machine 24 of the primary processing apparatus 5 measures and obtains the dimension data of the sintered article Q, and transmits the communication frame containing the obtained dimension data to the server apparatus 10.

The sintered article Q delivered from the primary processing apparatus 5 is picked up from the primary processing apparatus 5 and disposed on the convey tray 16 conveyed by a conveyor 18D one by one by a not-shown robot arm.

Between the primary processing apparatus 5 and the upstream portion of the conveyor 18D (the left end of the conveyor 18D in FIG. 3), a code reader S8 and a wireless writer S9 are provided.

The code reader S8 transmits the communication frame containing the read value of the product ID and the read time point to the server apparatus 10, and notifies the wireless writer S9 of the read value of the product ID. The wireless writer S9 writes the notified read value of the product ID on the IC tag 17 of the convey tray 16 conveyed by the conveyor 18C.

The code reader S8 is positioned at the delivery portion of the primary processing apparatus 5. Accordingly, the read time point of the code reader S8 substantially coincides with the primary processing end time point of the sintered article Q.

Figure 4:
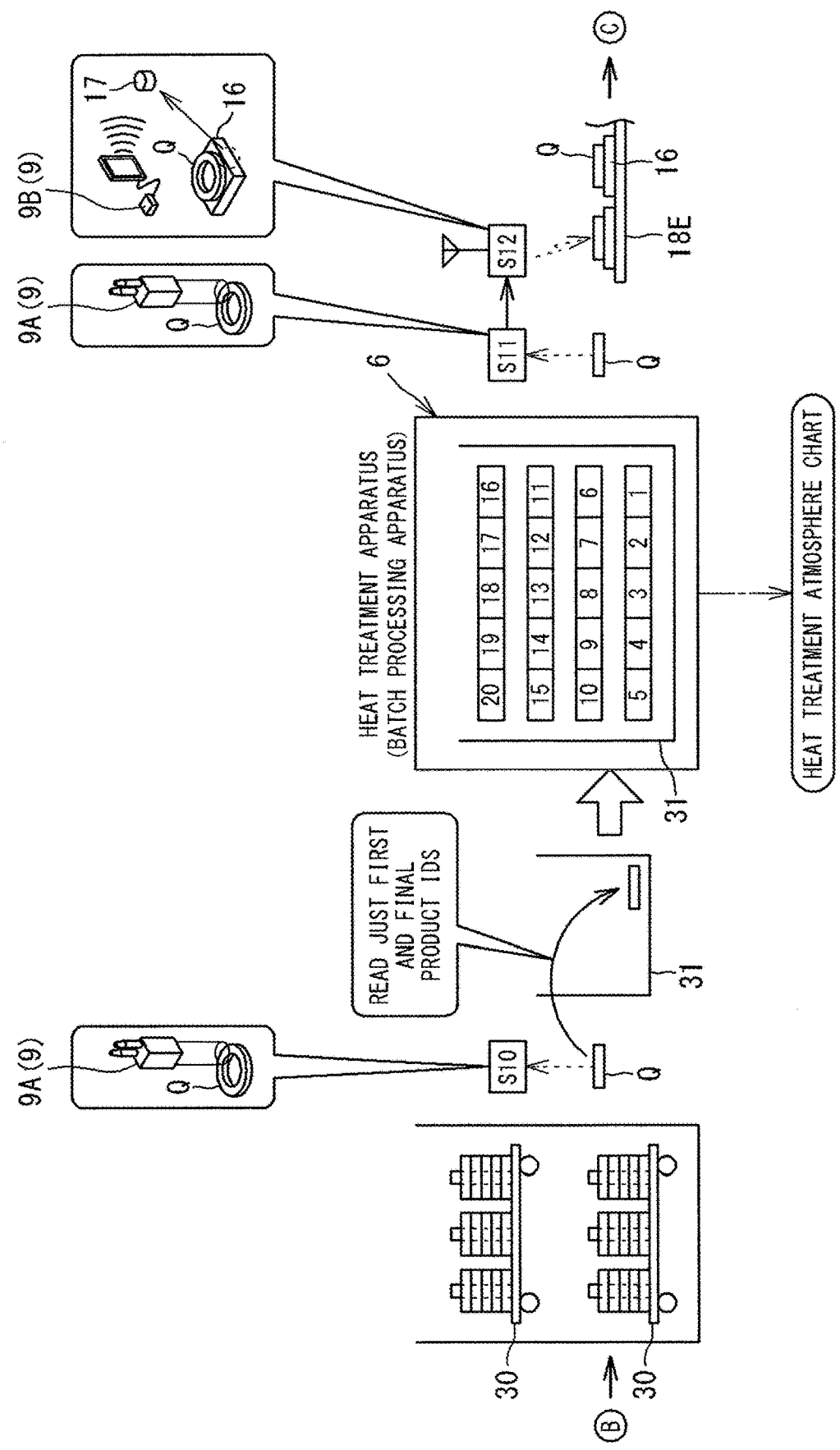
FIG. 4 is an explanatory illustration showing the data collection flow in the production line.

The sintered articles Q conveyed by the conveyor 18D are once collected on a stock board 30 which is a skewer board equipped with casters (see FIG. 4). The collecting work on the stock board 30 is performed by a not-shown robot arm, and the sintered articles Q are arranged in order of the serial number of the product ID.

The sintered articles Q collected in order of the serial number are loaded in a basket-like batch case 31 carried into the heat treatment apparatus 6 so as to be individually juxtaposed to each other. The work of loading each sintered article Q into the batch case 31 may be performed manually or with a robot arm.

The storage unit 53 of the server apparatus 10 stores the correspondence between the loading order of the sintered articles Q to the batch case 31, and the load position of the sintered articles C in the batch case 31. For example, in the example shown in FIG. 4, the correspondence is defined as follows:

the first to fifth sintered articles Q in loading order:
    loaded to occupy the position from the right end to the left end in the first stage of the batch case 31.
the sixth to tenth sintered articles Q in loading order:
    loaded to occupy the position from the right end to the left end in the second stage of the batch case 31.
the eleventh to fifteenth sintered articles Q in loading order:
    loaded to occupy the range from the right end to the left end in the third stage of the batch case 31.
the sixteenth to twentieth sintered articles Q in loading order:
    loaded to occupy the range from the right end to the left end in the fourth stage of the batch case 31.

In this case, when the sintered articles Q stored in order of the serial number are loaded into the batch case 31, the operator or the robot arm should read with the code reader S10 the product ID of the sintered articles Q firstly and finally put in the batch case 31.

Accordingly, the code reader S10 transmits the read value of the product ID of the firstly loaded sintered article Q and the read value of the product ID of the finally loaded sintered article Q to the server apparatus 10. The communication unit 51 of the server apparatus 10 receives the read values of the first and final product IDs, and the storage unit 53 stores these read values.

Based on the read values of the first and final product IDs received by the communication unit 51 and stored by the storage unit 53, and the above-described correspondence previously stored in the storage unit 53, the control unit 52 of the server apparatus 10 specifies the load positions of all the sintered articles Q loaded in the batch case 31.

For example, it is assumed that the serial number of 20 pieces of sintered articles Q loaded in one batch case 31 is X1001 to X1020, and the read value of the first sintered article Q contains X1001 and the read value of the final sintered article Q contains X1020.

In this case, the control unit 52 of the server apparatus 10 determines that the load position of five sintered article Q with the product IDs X1001 to X1005 is the first stage of the batch case 31.

The control unit 52 of the server apparatus 10 determines that the load position of the five sintered articles Q with the product IDs X1006 to X1010 is the second stage of the batch case 31.

The control unit 52 of the server apparatus 10 determines that the load position of the five sintered articles Q with the product IDs X1011 to X1015 is the third stage of the batch case 31.

Similarly, the control unit 52 of the server apparatus 10 determines that the load position of the five sintered articles Q with the product IDs X1016 to X1020 is the fourth stage of the batch case 31.

Note that, while FIG. 4 shows that one batch case 31 stores 20 pieces of sintered articles Q for the sake of clarity, practically 1000 to 1500 pieces of sintered articles Q are loaded in one batch case 31.

The heat treatment apparatus 6 generates a heat treatment atmosphere chart for each heat treatment process, and transmits the communication frame containing the generated heat treatment atmosphere chart to the server apparatus 10.

The sintered articles Q delivered from the heat treatment apparatus 6 are taken out from the batch case 31 manually or by a not-shown robot arm and each disposed on the convey tray 16 conveyed by a conveyor 18E one by one.

Between the heat treatment apparatus 6 and the upstream portion of the conveyor 18E (the left end of the conveyor 18E in FIG. 4), a code reader S11 and a wireless writer S12 are provided.

The code reader S11 transmits the communication frame containing the read value of the product ID and the read time point to the server apparatus 10, and notifies the wireless writer S12 of the read value of the product ID. The wireless writer S12 writes the notified read value of the product ID on the IC tag 17 of the convey tray 16 conveyed by the conveyor 18E.

The code reader S11 is positioned downstream to the heat treatment apparatus 6. Accordingly, the read time point of the code reader S11 substantially coincides with the heat treatment completion time point of the sintered article Q.

The sintered article Q conveyed by the conveyor 18E is separated from the convey tray 16 by a not-shown robot arm, and supplied one by one to the secondary processing apparatus 7.

Between the downstream portion of the conveyor 18E (the right end of the conveyor 18E in FIG. 5) and the secondary processing apparatus 7, a wireless reader S13 is provided.

The wireless reader S13 reads the product ID from the IC tag 17 of the convey tray 16, and transmits the communication frame containing the read value and the read time point to the server apparatus 10.

The wireless reader S13 is positioned at the feed portion of the secondary processing apparatus 7. Accordingly, the read time point of the wireless reader S13 substantially coincides with the supply time point of the sintered article Q to the secondary processing apparatus 7.

The final products R delivered from the secondary processing apparatus 7 are each disposed on the convey tray 16 conveyed by a conveyor 18F one by one by a not-shown robot arm.

Between the secondary processing apparatus 7 and the upstream portion of the conveyor 18F (the left end of the conveyor 18F in FIG. 5), a code reader S14 and a wireless writer S15 are provided.

The code reader S14 transmits the communication frame containing the read value of the product ID and the read time point to the server apparatus 10, and notifies the wireless writer S15 of the read value of the product ID. The wireless writer S15 writes the notified read value of the product ID on the IC tag 17 of the convey tray 16 conveyed by the conveyor 18F.

The code reader S14 is disposed at the delivery portion of the secondary processing apparatus 7. Accordingly, the read time point of the code reader S14 substantially coincides with the secondary process complete time point of the final product R.

Between the downstream portion of the conveyor 18F (the right end of the conveyor 18F in FIG. 5) and the inspection apparatus 8, a wireless reader S16 is provided.

The wireless reader S16 reads the product ID from the IC tag 17 of the convey tray 16, and transmits the communication frame containing the read value and the read time point to the server apparatus 10.

The wireless reader S16 is positioned at the feed portion of the inspection apparatus 8. Accordingly, the read time point of the wireless reader S16 substantially coincides with the supply time point of the final product R to the inspection apparatus 8.

The inspection apparatus 8 generates inspection data which is at least one of the roundness inspection and magnetic particle testing for each final product R, and transmits the communication frame containing the generated inspection data to the server apparatus 10.

[Stock Adjusting Apparatus of Sintered Article]

Figure 6:
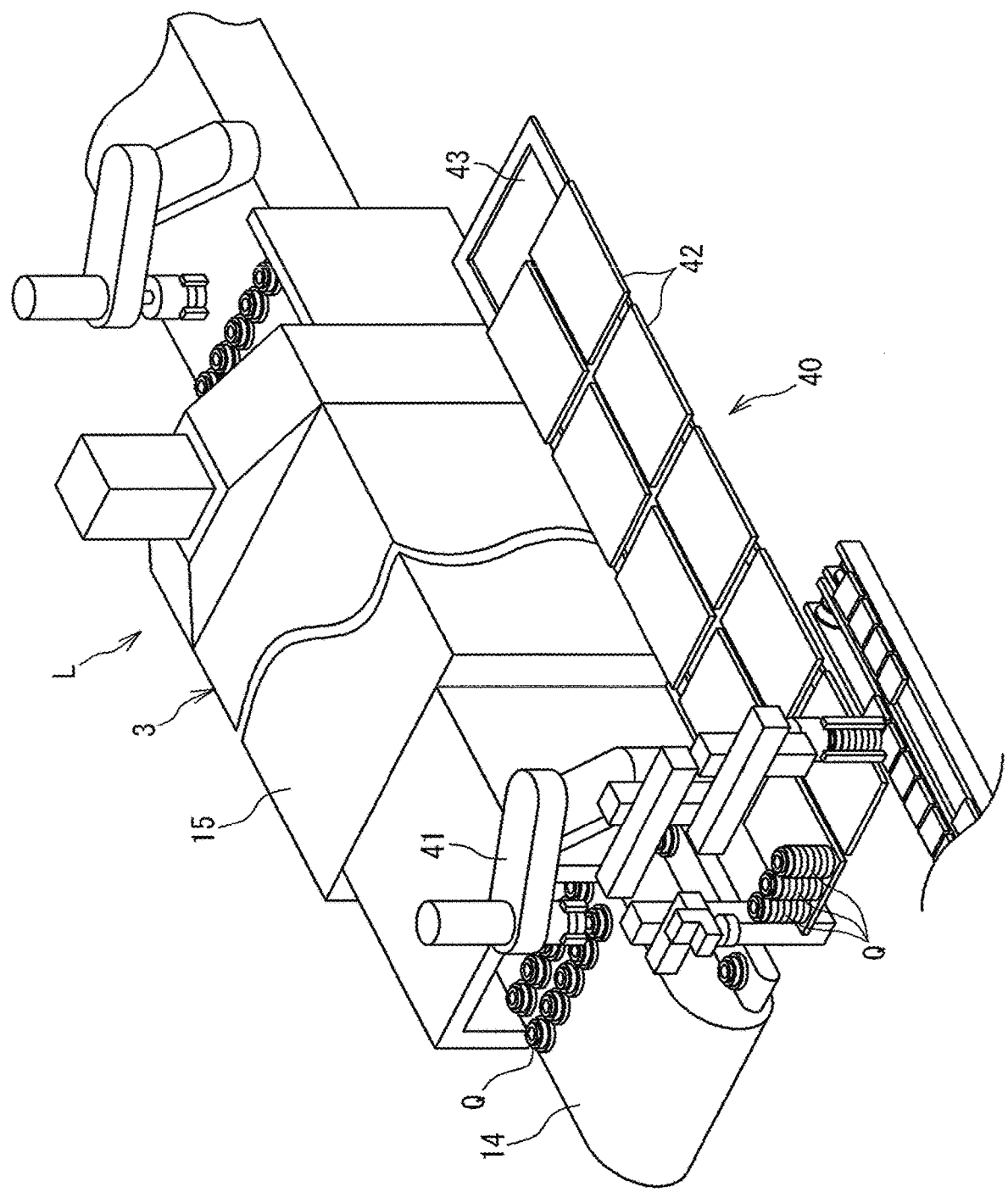
FIG. 6 is a perspective view of a sintering apparatus and a stock adjusting apparatus for sintered articles.

FIG. 6 is a perspective view of the sintering apparatus 3 and a stock adjusting apparatus 40 for the sintered articles Q.

In the production line L according to the present embodiment, upon any trouble, all the apparatuses forming the production line L stop their operation. However, the sintering apparatus 3 which includes the sintering chamber 15 inside which the temperature reaches 1000° C. or more cannot stop its operation until a predetermined delay period (for example, 10 minutes) elapses.

Accordingly, the production line L according to the present embodiment further includes a stock adjusting apparatus 40 capable of adjusting the stock amount of the sintered articles Q carried out from the sintering apparatus 3.

As shown in FIG. 6, the stock adjusting apparatus 40 includes a robot arm 41 configured to pick up each sintered article Q from the mesh belt 14 of the sintering apparatus 3, stock boards 42 which are skewer boards on which the sintered articles Q are tentatively disposed, and the mount 43 for the stock boards 42. The rotary range of the robot arm 41 is variable depending on the existence/absence of any control signal.

In the normal operation, for example, three stock boards 42 are placed on the mount 43. In this case, the rotary range of the robot arm 41 is set in a range capable of reaching the three stock boards 42.

When an error occurs in the production line L, the number of stock boards 42 placed on the mount 43 is increased. For example, the number of stock boards 42 are increased to the number by which all the sintered articles Q in the sintering chamber 15 can be tentatively disposed (for example, 10 pieces).

When an error occurs in the production line L, any external apparatus such as the server apparatus 10 transmits a control signal indicative of the occurrence of the error to the robot arm 41.

When the robot arm 41 receives the control signal, the robot arm 41 changes its rotary range to a range capable of reaching the ten stock boards 42, and continues the tentative disposing work of the sintered articles Q on the stock boards 42 until all the sintered articles Q are tentatively disposed.

[Effect of Manufacturing Facility]

As has been described above, in the manufacturing facility according to the present embodiment, the communication unit 51 of the server apparatus 10 receives the read value of the product ID from the code reader S10, and the control unit 52 of the server apparatus 10 specifies the load position of the sintered article Q in the batch case 31 on the basis of on the received read value. This makes it possible to monitor the location of the sintered article Q of the predetermined product ID in the heat treatment apparatus 6 in the heat treatment process.

Accordingly, the history of the heat treatment process in the batch-scheme heat treatment apparatus 6 can be monitored for each sintered product (sintered article Q).

For example, in the case where the heat treatment atmosphere chart output from the heat treatment apparatus 6 includes the temperature history for each installation height, i.e., for each of the first to fourth stages, the temperature history can be precisely specified for each sintered article Q by specifying which stage a sintered article Q with a predetermined product ID is in.

With the manufacturing facility according to the present embodiment, just reading the product IDs of the first and final sintered articles Q specifies the load position for all the sintered article Q loaded in the batch case 31.

This contributes to reducing the frequency of the code reader S10 reading the product IDs. In particular, as in the present embodiment, in the case where the sintered articles Q of 1000 pieces or more are loaded in one batch case, the frequency of the code reader S10 reading the product IDs is largely reduced. This reduces the time taken for the work of loading the sintered articles Q in the batch case 31.

[Other Variation]

The foregoing embodiment should be construed as illustrative in every aspect and not limiting. The scope of the present invention is defined not by the foregoing description but by the scope of claims, and intended to include all changes which come within the meaning and range of equivalency of the claims.

In the embodiment, while just the product ID of the first sintered article Q and the product ID of the final sintered article Q are read by the code reader S10, the product IDs of all the sintered articles Q loaded in the batch case 31 may be read.

However, in this case, the work of reading the product ID and then loading the sintered article Q in the batch case 31 must be repeatedly performed as many as the number of the sintered articles Q. Therefore, the time taken for the work of loading the sintered articles Q becomes long as compared to the embodiment.

In the embodiment, while the overview of the present invention has been described exemplarily on the batch-scheme heat treatment apparatus 6, the batch processing apparatus to which the present invention is applicable is not limited to the heat treatment apparatus 6.

That is, the present invention is also applicable to a manufacturing facility including a batch processing apparatus other than the heat treatment apparatus 6 such as, for example, an ST processing apparatus (steam processing apparatus), a resin impregnation apparatus, and a plating processing apparatus.

REFERENCE SIGNS LIST

1: MOLDING APPARATUS
2: MARKING APPARATUS
3: SINTERING APPARATUS
4: SIZING APPARATUS
5: PRIMARY PROCESSING APPARATUS
6: HEAT TREATMENT APPARATUS (BATCH PROCESSING APPARATUS)
7: SECONDARY PROCESSING APPARATUS
8: INSPECTION APPARATUS
9: PASSING DETECTING APPARATUS
9A: CODE READER
9B: WIRELESS WRITER
9C: WIRELESS READER
10: SERVER APPARATUS
12: PRESS-MOLDING MACHINE
13: WEIGHT MEASURING DEVICE
14: MESH BELT
15: SINTERING CHAMBER
16: CONVEY TRAY
17: IC TAG
18A TO 18F: CONVEYOR
21: PRESS-MOLDING MACHINE
22: CUTTING MACHINE
23: BORING MACHINE
24: DIMENSION MEASURING MACHINE
25: FINISHING PROCESS MACHINE
26: POLISHING APPARATUS
27: MEASURING APPARATUS
28: MAGNETIC PARTICLE TESTING APPARATUS
30: STOCK BOARD
31: BATCH CASE
40: STOCK ADJUSTING APPARATUS
41: ROBOT ARM
42: STOCK BOARD
43: MOUNT
51: COMMUNICATION UNIT
52: CONTROL UNIT
53: STORAGE UNIT
L: PRODUCTION LINE (MANUFACTURING FACILITY)
C: TWO-DIMENSIONAL CODE
P: POWDER COMPACT (INTERMEDIATE MATERIAL)
Q: SINTERED ARTICLE (INTERMEDIATE MATERIAL)
R: FINAL PRODUCT

The invention claimed is:

1. A manufacturing facility of a sintered product, comprising:

a molding apparatus configured to press-mold raw material powder containing metal powder to fabricate powder compacts;

a marking apparatus configured to mark a product ID including a serial number on each of the powder compacts;

a batch processing apparatus configured to perform a predetermined batch process on intermediate materials which are the powder compacts or sintered articles of the powder compacts, the batch process being any one of a heat treatment, a steam process, a resin impregnation process and a plating process;

a code reader configured to read the product ID of each of the intermediate materials loaded in a batch case of the batch processing apparatus; and a server apparatus configured to communicate with all of the apparatuses, wherein the server apparatus includes a communication unit configured to receive a read value of the product ID from the code reader, and a control unit configured to specify a load position of each of the intermediate materials in the batch case based on the received read value.

2. The manufacturing facility of a sintered product according to claim 1, wherein the server apparatus further includes a storage unit configured to store correspondence between a loading order of the intermediate materials into the batch case and a load position of each of the intermediate materials in the batch case.

3. The manufacturing facility of a sintered product according to claim 2, wherein the communication unit receives, from the code reader apparatus, the read value as to firstly and finally loaded ones of the intermediate materials loaded into the batch case, the storage unit stores the received read value, and the control unit specifies the load position for every one of the intermediate materials in the batch case based on the stored read value and the correspondence.

4. The manufacturing facility of a sintered product according to claim 1, further comprising:

a sintering apparatus configured to sinter the powder compacts to fabricate the sintered articles; and a stock adjusting apparatus configured to adjust a stock amount of the sintered articles carried out from the sintering apparatus, wherein the stock adjusting apparatus is capable of increasing, upon occurrence of an error, a capacity of the stock amount for the sintered articles so that all the sintered articles in a sintering chamber of the sintering apparatus are stored.

5. A method of manufacturing a sintered product using the manufacturing facility of claim 1, comprising:

a molding step of press-molding raw material powder containing metal powder to fabricate powder compacts;

a marking step of marking the product ID on each of the powder compacts;

a batch processing process of performing the predetermined batch process on intermediate materials which are the powder compacts or sintered articles of the powder compacts;

a reading step of reading the product ID of each of the intermediate materials loaded in a batch case used in the batch processing process; and a step of specifying the load position of each of the intermediate materials in the batch case based on the read value acquired in the reading step.

* * * * *